C. L. JONES.
FLOUR SIFTER.
APPLICATION FILED DEC. 23, 1907.

911,130.

Patented Feb. 2, 1909

Witnesses:
Walter L. Finn
Francis H. Bishop

Inventor:
Cora L. Jones,
by her attorney, Charles J. Gooding

UNITED STATES PATENT OFFICE.

CORA L. JONES, OF PONKAPOG, MASSACHUSETTS.

FLOUR-SIFTER.

No. 911,130.     Specification of Letters Patent.     Patented Feb. 2, 1909.

Application filed December 23, 1907. Serial No. 407,633.

*To all whom it may concern:*

Be it known that I, CORA L. JONES, a citizen of the United States, residing at Ponkapog, in the county of Norfolk and State of Massachusetts, have invented new and useful Improvements in Flour-Sifters, of which the following is a specification.

This invention relates to improvements in flour sifters, and the object is primarily to provide a flour sifter which will thoroughly sift and aerate flour without the use of moving parts and without removal of the flour from the sifter until the sifting and aeration of the flour is complete.

Another object is to provide an end for the sifter so arranged that when the user empties the flour from the sifter into a cup or other small receptacle the use of a funnel is obviated.

The invention consists in the combination and arrangement of parts set forth in the following specification and particularly pointed out in the appended claim.

Figure 1:
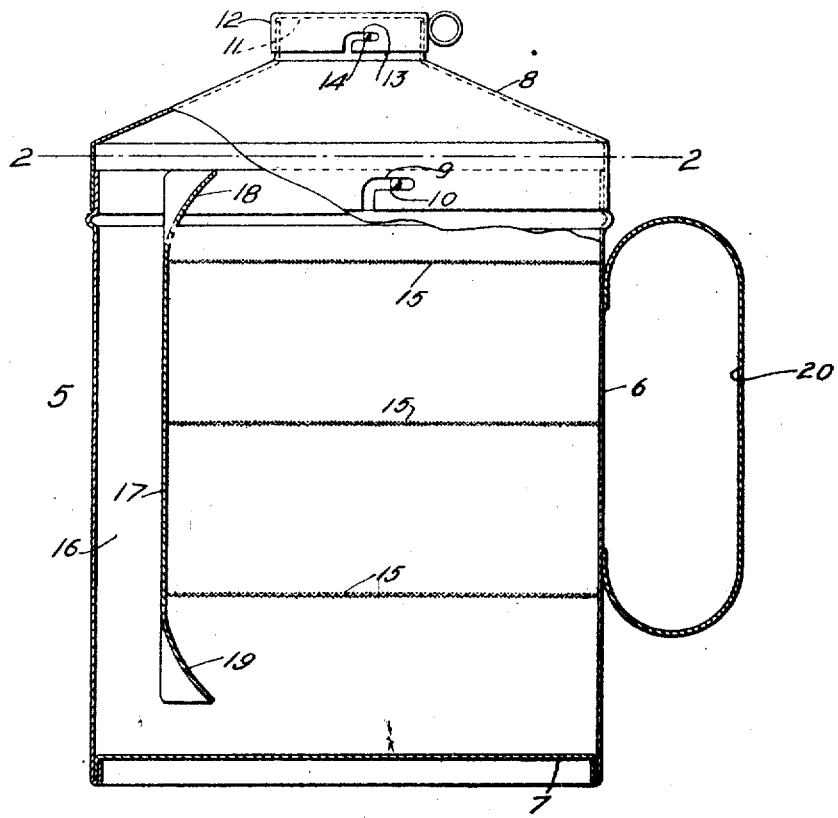
Figure 2:
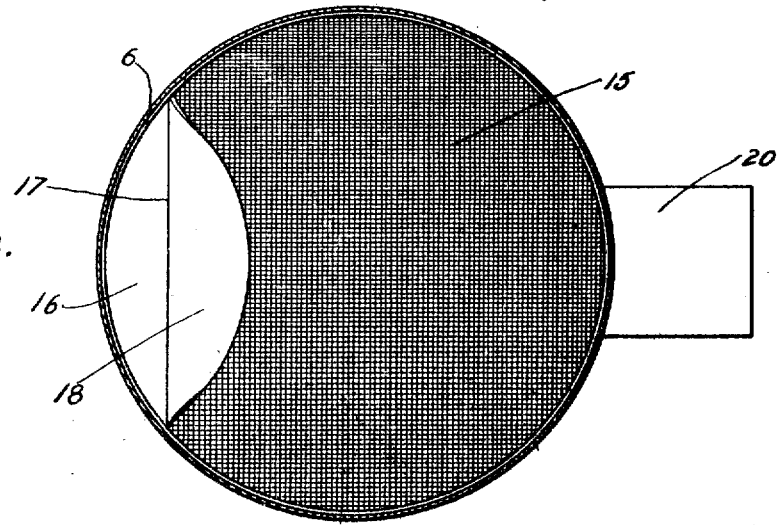

Referring to the drawings: Figure 1 is a central vertical sectional elevation of a flour sifter embodying my invention. Fig. 2 is a plan section taken on line 2—2 of Fig. 1.

Like numerals refer to like parts throughout the several views of the drawings.

In the drawings, 5 is a casing comprising a preferably cylindrical shell 6 having one end closed by a bottom 7, the other end being closed by a preferably frusto-conical cover or end 8 which may be provided with a right-angled or L-shaped slot 9 in which is located a projection 10 formed on the shell 6. The cover 8 may be detached from the shell 6 by rotating said cover in the proper direction to bring the vertical portion of the slot 9 into alinement with the projection 10 and then lifting said cover thus causing said projection to pass out of said slot. When the projection 10 is located in the position shown in the drawing, the cover 8 is securely attached to the shell 6 so that it cannot become accidentally detached therefrom. The cover 8 is provided with an outlet orifice 11 which is normally closed by a cap 12 which may be provided with a right-angled or L-shaped slot 13 in which is located a projection 14 formed on the cover 8, whereby said cap is detachably attached to said cover and cannot become accidentally detached therefrom.

A plurality of sieves or screens 15 extend across the shell 6 and are rigidly secured thereto. The casing 5 is provided with a passage 16 extending transversely of the sieves 15 and terminating at its upper and lower ends above and below the upper and lower sieves 15, respectively, said passage in this instance being formed by introducing into the casing 5 a wall 17 against which the sieves 15 abut. The wall 17 is bent inwardly at 18 and 19. These inwardly bent portions act to deflect the flour inwardly toward the central portion of the sifter as it falls through the sieves and thus when the sifter is inverted to sift the flour back again toward the opposite end there is little chance of any of the flour passing through the air passage. The casing 5 may be provided with any suitable form of handle such as the handle 20 shown in the drawing.

The sifter is used in the following manner: The sifter is placed in the position shown in Fig. 1, the cover 8 is removed, the flour to be sifted is placed on the uppermost sieve 15 and said cover is then replaced. The user grasps the handle 20 and shakes the sifter in a horizontal direction thus causing the flour to pass through the upper sieve onto the middle or intermediate sieve and thence through the lowermost sieve onto the bottom 7. It will be seen that the passage 16 provides for the escape of air from beneath the sieves during the sifting process just described and the air that passes from the lower part of the sifter passes through said passage upwardly into the upper part of said sifter. If it were not for the provision of the passage 16, there would be a tendency to form an air pressure in the space at the bottom and a partial vacuum in the space at the top of the sifter owing to the fact that the particles of flour have a very strong tendency to cling to each other and prevent the passage of air therebetween. The whole mass of flour now being at the bottom of the sifter the user then inverts the same and repeats the foregoing shaking process which results in the flour passing through the series of sieves once more to the opposite end. The user repeats the foregoing a number of times and the flour by passing repeatedly through the sieves is thoroughly aerated and lightened up by separating the particles and allowing them to become separated by very small air spaces and this is done without the use of any of the usual agitators. Furthermore, during the process of sifting and aerating the flour the same remains in the sifter until it is entirely sifted and aerated. The function of the inwardly bent portions of the wall 17 is to deflect the flour from the passage 16 toward the central part of the top and bottom of the sifter. If now it be desired to empty the flour into a small vessel such as a cup, the user removes the cap 12 and the flour passes through the orifice 11 into the cup and thus it will be seen that the use of a funnel is obviated.

Having thus described my invention, what I claim and desire by Letters Patent to secure is:

In a flour sifter, a closed casing, and a sieve extending across said casing, said casing being provided with a passage and having a wall which bounds said passage on one side, said wall extending transversely of and terminating beyond opposite sides, respectively, of said sieve adjacent to said ends, said wall being inclined inwardly at its opposite ends, respectively, toward the central portion of said casing.

In testimony whereof I have hereunto set my hand in presence of two subscribing witnesses.

CORA L. JONES.

Witnesses:
 LOUIS A. JONES,
 SADIE V. McCARTHY.